Reissued Apr. 11, 1950

Re. 23,218

UNITED STATES PATENT OFFICE 23,218

CATALYTIC BLEACHING WITH CHLORITES

Robert M. Levy and James E. Brennan, Brevard, N. C., assignors to Ecusta Paper Corporation, a corporation of Delaware No Drawing. Original No. 2,477,631, dated August 2, 1949, Serial No. 579,150, February 21, 1945. Application for reissue February 13, 1950, Serial No. 144,025

7 Claims. (Cl. 8—105)

Matter enclosed in heavy brackets [ ] appears in the original patent but forms no part of this reissue specification; matter printed in italics indicates the additions made by reissue

Our invention relates to the bleaching of cellulosic materials such as pulp for the manufacture of high quality paper, and textile fabrics, with chlorites of alkali metals or alkaline earth metals. It is directed more particularly to this type of bleaching process and in which the action of the chlorites is catalyzed by water soluble salts of certain metals.

One of the features of our catalytic process is that it permits carrying out of the bleaching operation at substantially neutral or alkaline pH values. In accordance with our discovery the catalytic salts permit efficient bleaching with the chlorites at a pH range of about 5 to 8.5. Within this range we have found a commercially advantageous pH range of about 7 to 8.

The use of these catalysts in accordance with our invention markedly increases the activity of the chlorite bleaching compounds in neutral and alkaline reaction solutions and enables the bleaching to be carried out in equipment which is not acid-proof, such as for example, that normally used in the soda or kraft processes for producing paper pulp.

The chlorites that we may employ in the process of our invention include the [alkaline] *alkali metal* chlorites, such as, sodium chlorite, and the alkaline earth chlorites, such as, calcium chlorite.

The catalyst which we used to catalyze the action of the chlorites and thereby render them effective bleaching agents in a neutral or alkaline medium, include the water soluble salts of cobalt, nickel, [copper,] and manganese. The catalytic effectiveness of these salts varies somewhat although they are in the same general category from the standpoint of catalyzing the chlorite bleaching agent. The amounts required for effective use of these salts for catalyzing the chlorites are relatively very small as compared with the amount of the chlorite compound itself. In other words, the amounts of the catalytic salts required are in the order of characteristic amounts for catalyst, such as for example 0.01% to 0.5%.

Although we do not wish to be limited to any specific theory for explaining the effectiveness of our invention, we believe that the chlorite is decomposed by our catalyst to provide an adequate amount of chlorine dioxide, $ClO_2$, which bleaches the cellulose. While it is relatively easy to obtain the chlorine dioxide gas from the chlorite salt, such as for example, sodium chlorite, $NaClO_2$, by treatment with acid, it is much more difficult to effect the decomposition and rapid formation of the $ClO_2$ gas at the higher pH values, especially above a pH of 5. We have found that this desired result can now be obtained by catalyzing the chlorite salt in aqueous solution with salts of the above mentioned metals. Typical examples of satisfactory catalytic salts are cobalt chloride and cobalt nitrate.

The cellulosic materials to be bleached by the method of our invention include textiles, wood pulp and vegetable fiber pulp; typical examples being kraft wood pulp, [flex] *flax* fiber pulp and cotton. The process is applicable generally to pulps produced by the conventional kraft, soda, sulfite or neutral sulfite processes.

Amounts of the chlorites and catalyst that may be used satisfactorily in accordance with our invention vary widely. In general, it is not necessary to use more than about 0.5% of the catalyst salt based on the weight of the pulp to be bleached; and often-times this percentage of the catalyst may be as low as about 0.01%. In a typical case characteristic of our invention, sodium chlorite may be used as the bleaching agent and cobalt nitrate used as the catalyzing agent for the chlorite. Under the proper bleaching conditions, and at neutral or alkaline pH values, up to pH 8.5, the cobalt nitrate will effect decomposition of the sodium chlorite which effects bleaching of the cellulose without adverse degradation, and the bleaching may be carried out in conventional, non-acid-proof equipment. For a further and more complete understanding of our invention, the following illustrative but non-limiting examples of the bleaching operations are given.

EXAMPLE I

Chlorinated kraft pulp, in the amount of about 60 grams, oven dry weight, was added to 940 cc. of liquor containing water, about 1.4 grams of sodium chlorite, and about 0.09 grams of the catalyst, cobalt nitrate. The latter was in the form of a hexahydrate $Co(No_3)_2.6H_2O$. The pH of the mixture was about 7.5. Sufficient water was used to give the mixture a consistency of about 6% and this fluid pulp suspension was held at a temperature of about 75° to 85° C. for three hours. The pH value was maintained at about 7.5, by additions of suitable alkali, such as caustic soda, as necessary. The formation of some insoluble cobalt pigment gives a slight discoloration, which is removed by a reducing compound, hydrosulfite. Following this treatment, the pulp was washed, and showed the following characteristics in comparison with the original pulp.

| | Original Pulp | Bleached Pulp |
|---|---|---|
| Total available chlorine applied ..... percent | 0 | 3.0 |
| Total colbalt applied ..... do | 0 | 0.03 |
| Brightness (G. E. meter) | 41.5 | 83.0 |
| Viscosity (Tappi standard) | 38 | 35 |

EXAMPLE II

The treatment described above under Example I was repeated in this case, using different materials, as indicated below:

| | Grams |
|---|---|
| Chlorinated flax pulp (O. D. weight) | 60 |
| Water | 940 |
| Sodium chlorite | 1.65 |
| Nickelous nitrate $Ni(NO_3)_2 6H_2O$ | 0.09 |

The results obtained in this example are as follows:

| | Original Pulp | Bleached Pulp |
|---|---|---|
| Total available chlorine used ..... percent | 0 | 3.5 |
| Total nickel used ..... do | 0 | 0.03 |
| Brightness (G. E. meter) | 40 | 85 |
| Viscosity (Tappi standard) | 100 | 100 |

EXAMPLE III

The process given in Example I above was again carried out, in this case using materials similar to those in Example I, except for a change in the catalyst:

| | Grams |
|---|---|
| Chlorinated kraft pulp | 60 |
| Water | 940 |
| Sodium chlorite | 1.4 |
| $Mn(SO_4).H_2O$ | 0.06 |

At the end of the bleaching process in this example, the dark colored manganese compound that was present was removed by washing the bleached pulp with acidified water. The results obtained in this example [as] *are* shown by the following values:

| | Original Pulp | Bleached Pulp |
|---|---|---|
| Available chlorine applied ..... percent | 0 | 3.0 |
| Total manganese applied ..... do | 0 | 0.03 |
| Brightness (G. E. meter) | 41.5 | 84.0 |
| Viscosity (Tappi standard) | 38 | 35 |

The brightness and viscosity values in the above three examples show good bleaching and high retention of viscosity which means that little or no degradation has resulted from the bleaching operation. The insoluble and somewhat discolored compounds that may be formed in the bleaching operations, such as the cobalt pigment mentioned above, are easily removed by washing with acidified water or decolorized by treatment with a reducing compound, e. g. sulfur dioxide, a soluble metal bi-sulfite or hydrosulfite.

The above described process and chemicals may be used in accordance with our invention for effecting complete bleaching of the pulp, that is, without the use of previous or other bleaching steps. However, the invention appears to offer the best advantages, at the present time, when applied to pulp that has been partially bleached in the usual manner using chlorine or hypochlorites. It is when the pulp has reached the partially bleached stage and requires complete bleaching to a high brightness that it is most susceptible to degradation. In other words, the cellulose is more likely to become degraded during the latter stages of the bleaching operation, and in these stages we have found our catalytic chlorite bleaching process to work most effectively.

Various other modifications and changes may be made in the materials and process described hereinabove without departing from the scope of our invention, some of the novel features of which are defined in the appended claims.

We claim:

1. In bleaching textiles, the improvement which comprises treating the textiles with an aqueous solution containing a chlorite of a metal of the class consisting of the [alkaline] *alkali* metals and the [alkali] *alkaline* earth metals, and a catalyst for said chlorite comprising a relatively small amount of a water soluble salt of a metal of the class consisting of cobalt, nickel and manganese, and maintaining the pH during the bleaching operation at a value of about pH 5 to pH 8.5.

2. In bleaching vegetable fiber pulp, the improvement which comprises treating the vegetable fiber pulp with an aqueous solution containing a chlorite of a metal of the class consisting of the [alkaline] *alkali* metals and the [alkali] *alkaline* earth metals, and a catalyst for said chlorite comprising a relatively small amount of a water soluble salt of a metal of the class consisting of cobalt, nickel, and manganese, and maintaining the pH during the bleaching operation at a value of about pH 5 to pH 8.5.

3. In bleaching wood pulp, the improvement which comprises treating the wood pulp with an aqueous solution containing a chlorite of a metal of the class consisting of the [alkaline] *alkali* metals and the [alkali] *alkaline* earth metals, and a catalyst for said chlorite comprising a relatively small amount of a water soluble salt of a metal of the class consisting of cobalt, nickel, and manganese, and maintaining the pH during the bleaching operation at a value of about pH 5 to pH 8.5.

4. In bleaching cellulosic material, the improvement which comprises treating the cellulosic material with an aqueous solution containing a chlorite of a metal of the class consisting of the alkali metals and the alkaline earth metals, and a catalyst for said chlorite comprising a relatively small amount of a water soluble salt of a metal of the class consisting of cobalt, nickel, and manganese, and maintaining the pH during the bleaching operation at a value of about pH 5 to pH 8.5.

5. In bleaching kraft pulp, the improvement which comprises treating the kraft pulp with an aqueous solution containing a chlorite of a metal of the class consisting of the alkali metals and the alkaline earth metals, and a catalyst for said chlorite comprising a relatively small amount of a water soluble salt of a metal of the class consisting of cobalt, nickel, and manganese, and maintaining the pH during the bleaching operation at a value of about pH 5 to pH 8.5.

6. In bleaching flax pulp, the improvement which comprises treating the flax pulp with an aqueous solution containing a chlorite of a metal of the class consisting of the alkali metals and the alkaline earth metals, and a catalyst for said chlorite comprising a relatively small amount of a water soluble salt of a metal of the class consisting of cobalt, nickel, and manganese, and maintaining the pH during the bleaching operation at a value of about pH 5 to pH 8.5.

7. In bleaching soda pulp, the improvement which comprises treating the soda pulp with an aqueous solution containing a chlorite of a metal of the class consisting of the alkali metals and the alkaline earth metals, and a catalyst for said chlorite comprising a relatively small amount of a water soluble salt of a metal of the class consisting of cobalt, nickel, and manganese, and maintaining the pH during the bleaching operation at a value of about pH 5 to pH 8.5.

ROBERT M. LEVY.
JAMES E. BRENNAN.

REFERENCES CITED

The following references are of record in the file of this patent and the original patent:

UNITED STATES PATENTS

| Number | Name | Date |
|---|---|---|
| 321,452 | Pond | July 7, 1885 |
| 1,163,438 | Muller | Dec. 7, 1915 |
| 1,777,751 | Franz | Oct. 7, 1930 |
| 1,904,190 | Becher | Apr. 18, 1933 |
| 2,193,173 | Jellinek | Mar. 12, 1940 |
| 2,249,646 | Bragg | July 15, 1941 |
| 2,353,823 | Hampel | July 18, 1944 |
| 2,367,771 | Hampel | Jan. 23, 1945 |

FOREIGN PATENTS

| Number | Country | Date |
|---|---|---|
| 260,190 | Great Britain | Oct. 28, 1926 |
| 311,435 | Great Britain | May 7, 1929 |
| 722,871 | France | Mar. 29, 1932 |

OTHER REFERENCES

Hall, "Monthly Review," Textile Colorist, January 1938, page 39.

Taylor et al., "Sodium Chlorite, Properties and Reactions," Industrial and Engineering Chemistry, July 1940, pages 899–903.

J. F. White et al., "Chlorite vs. Hypochlorite Bleaching," Technical Association of the Pulp and Paper Industry, September 1940, pages 159–164.

Taylor et al., "Use of Sodium Chlorite in Bleaching," Tech. Ass'n Papers, 1940, pages 251–256, page 253 esp. pertinent.